(12) United States Patent
Sato

(10) Patent No.: US 6,296,300 B1
(45) Date of Patent: Oct. 2, 2001

(54) VEHICLE BODY STRUCTURE

(75) Inventor: Manabu Sato, Yokohama (JP)

(73) Assignee: Nissan Motor Co., Ltd., Kanagawa (JP)

( * ) Notice: Subject to any disclaimer, the term of this patent is extended or adjusted under 35 U.S.C. 154(b) by 0 days.

(21) Appl. No.: 09/615,899

(22) Filed: Jul. 13, 2000

(30) Foreign Application Priority Data

Jul. 15, 1999 (JP) .................................................. 11-202050

(51) Int. Cl.⁷ .............................. B62D 25/08; B62D 25/20
(52) U.S. Cl. .............. 296/189; 296/203.02; 296/203.04; 296/29
(58) Field of Search ............................... 296/189, 203.02, 296/203.04, 204, 194, 195, 29, 30

(56) References Cited

U.S. PATENT DOCUMENTS

| | | | | |
|---|---|---|---|---|
| 5,048,888 | * | 9/1991 | Willy et al. | 296/189 |
| 5,125,715 | * | 6/1992 | Kijima | 296/189 |
| 5,201,566 | * | 4/1993 | Mori | 296/194 X |
| 5,228,741 | * | 7/1993 | Ide | 296/189 X |
| 5,641,194 | * | 6/1997 | Honma et al. | 296/204 X |
| 5,984,403 | * | 11/1999 | Kuroda | 296/189 |
| 6,102,605 | * | 8/2000 | Emmons | 296/29 X |

FOREIGN PATENT DOCUMENTS

| | | | | |
|---|---|---|---|---|
| 42 08 700-A1 | * | 10/1992 | (DE) | 296/194 |
| 4-129833-A | * | 4/1992 | (JP) | 296/203.04 |
| 9-99870 | | 4/1997 | (JP) . | |

* cited by examiner

Primary Examiner—Joseph D. Pape
Assistant Examiner—Patricia L. Engle
(74) Attorney, Agent, or Firm—McDermott, Will & Emery

(57) ABSTRACT

A vehicle body structure provides an increased engine room collapsing stroke to increase energy absorption during a frontal or rear end collision. Force applied to side members is transmitted efficiently to a floor structure by controlled deformation of first, second and third structural portions of a impact redirecting and impact redirecting structure which interconnects the floor and the side members. Occurrence of bending deformation of the inboard end portions of the side members is attenuated to subject the front side member to collapsible compression which increases the engine room collapsible stroke.

34 Claims, 10 Drawing Sheets

VEHICLE BODY STRUCTURE

FIELD OF THE INVENTION

The present invention relates to a vehicle body structure.

BACKGROUND OF THE INVENTION

During an end-on collision of a vehicle, such as a full or partial frontal head-on or rear end collision, it is very important to absorb a great portion of impact energy by controlled deformation of the side members which form part of the front or rear compartments, (e.g. the engine room and trunk). It is ideal to deform, under compression, the side members in a collapsible manner because this form of deformation tends to maximize the amount of impact energy absorption.

Currently, the most popular measure is to provide a path of transmission of stress or force to structural members of the passenger compartment floor such as the side sills which extend along either side thereof. To improve the force transmission characteristics it is advantageous to increase the rigidity and stiffness of the floor. The use of extruded parts to increase stiffness and rigidity is known from JP-A-9-99870.

However, if there is a vertical offset between the floor and the side members, it is necessary to provide a joint structure whereby each front side member is rigidly connected to the floor. This establishes a structure which generates, during a collision, a moment of force which consists of the force applied to the floor by the front side member during initial stage of process of impact energy absorption, and the perpendicular distance (viz., the arm of the moment) between a point in the joint structure wherein bucking initiates and the side member. Occurrence of such moment places a bias a dash panel and its associated structure which tends to move it undesirably toward and/or into a passenger compartment which is located above the floor.

Accordingly, a need exists to minimize this bias and to ensure that vehicle structural members do not distort excessively and/or encroach into passenger cabin space in a manner which reduces passenger safety.

SUMMARY OF THE INVENTION

The present invention is directed to an arrangement which, upon application of force or stress greater than a predetermined magnitude during end-on collision of a vehicle, the transmission of force/stress is directed toward the vehicle floor structure to a floor in a manner which reduces the length of the above-mentioned arm of a moment of force around a portion of the structure proximate an end of the floor.

Accordingly, it is an object of the present invention to provide a vehicle body structure capable of reducing the magnitude of a moment around a portion in the proximity of an end of a floor while transmitting force to a floor, upon application of stress or force which is sufficiently great as to cause structural deformation of the vehicle body.

More specifically, a first aspect of the invention resides in a vehicle body structure for a vehicle having a longitudinal center line, comprising: a floor structure; a side member having an end, the side member extending in a direction essentially parallel to the longitudinal center line; a cross panel extending laterally across an end of the floor structure; and a deformation force redirecting structure which is connected to the cross panel and which has a force receiving surface portion spaced from an end of the floor, the force receiving surface portion engaging the end of the side member, the deformation force redirecting structure including: a first structural portion including the force receiving surface portion, a second structural portion interconnecting the first structural portion and a portion of the floor in the proximity of the predetermined end thereof, and a third structural portion interconnecting the side member and the floor, the first, second and third structural portions respectively exhibiting deformation resistances which induce the first structural portion to initially deform upon the application of a predetermined amount of pressure on at least a portion of the force receiving surface.

In this arrangement at least one of the floor structure, the side member, the cross panel, and the deformation force redirecting structure is made of a corrosion resistant light weight material which obviates the need for an externally applied corrosion preventing coating or treatment. Additionally, it is possible that the floor structure, the side member, the cross panel, and the deformation force redirecting structure are each one of extruded and die cast from a corrosion resistant light weight material which obviates the need for an externally applied corrosion preventing coating or treatment. The corrosion resistant light weight material is a light metal alloy such as an aluminum containing alloy, an aluminum based alloy, a magnesium containing alloy, or titanium containing alloy.

The side member and the floor are extruded and the deformation force redirecting structure includes a cross structural member which extends laterally across a longitudinal end of the floor and which is extruded and has at least one extruded feature which extends laterally across the longitudinal end of the floor.

The first structural portion has a lower deformation resistance than the third structural portion, while the second structural portion has a lower deformation resistance than the third structural portion and a higher deformation resistance than the first structural portion.

The first structural portion includes first upper and lower walls which defining a first laterally extending channel which has an essentially uniform cross-sectional profile, and wherein the upper wall has a lower deformation resistance than the lower wall. Alternatively, the first structural portion includes first walls defining a first channel having an essentially uniform cross-sectional profile, the second structural portion includes second walls defining a second channel having an essentially uniform cross-sectional profile, and the third structural portion includes third walls defining a third channel having an essentially uniform cross-sectional profile, and wherein each of the first, second and third channels respectively include at least one reinforcement therein.

In addition to the above, the vehicle body structure set forth above is such that the deformation force redirecting structure includes a first partition between the first channel and the second channel, a second partition between the first channel and the third channel, and a third partition between the second channel and the third channel, wherein the deformation force redirecting structure includes a hub member at which the first, second and third partitions merge, wherein the reinforcement wall within the first structural portion extends from the hub member and merges with an upper essentially horizontally extending wall which forms part of the first structural portion and which extends across an upper portion of the first channel, and wherein the third partition interconnects the hub member and an upper surface portion of the floor in the proximity of the end of the floor.

In the above arrangement the deformation force redirecting structure is a one piece extruded member, and/or a one piece die cast part.

A second aspect of the invention resided in that the channels of at least the second and third structural portions are filled with a filler. The deformation force redirecting structure further has a first socket which receives a portion of the floor, and a second socket which receives a portion of the side member.

Another aspect of the invention resides in structure wherein the first, second and third structural portions are respectively defined by first, second and third structural portions of the deformation force redirecting structure, the first structural portion is discrete from the second and third structural portions, the second and third structural portions are unitarily formed with one another, the second structural portion has a seat against which a portion of the first structural portion abuts, and the first and second structural portions include a hinge mechanism which interconnects the first and second structural portions and which permits limited angular displacement of the first structural portion relative to the second structural portion upon application of a force on the force receiving surface portion which is greater than a predetermined magnitude.

The vehicle body structure set forth above is such that the third structural portion includes a plurality of reinforcing members and wherein at least one of the side member and the floor includes an extruded part.

In accordance with the above aspect of the invention the vehicle body structure an end of the second structural portion is formed with first and second spaced seat portions, the second seat portion being disposed more distal from the floor structure than the first seat, wherein the first structural portion has first and second flange portions which respectively seat on the first and second seat portions, wherein the first and second flanges are welded to the respective first and second seat portions with welds which are broken upon the application of a predetermined amount of force to the force receiving portion, and wherein rotation limiting arrangement is provided between the first and second structural portions to limit the amount of relative movement that the first structural portion can undergo about the hinge mechanism with respect to the second structure portions. The third structural portion is connected a structural member of the floor which extends along the longitudinal center line.

Yet another aspect of the invention resides in a vehicle body structure for a vehicle having a longitudinal center line, comprising: a floor structure, the floor having first and second ends spaced along the longitudinal center line; a impact redirecting structure disposed with the first end of the floor structure, the impact redirecting structure having at least one force receiving surface portion which is longitudinally spaced in a first direction from the first end of the floor; the impact redirecting structure including a first structural portion that normally maintains the at least one force receiving surface portion in a predetermined position; the impact redirecting structure being so constructed and arranged as to provide an arrangement wherein, when the force receiving surface portion is subjected to a force greater than a predetermined magnitude, the force causes the first structural portion to displace the force receiving surface portion away from the predetermined position in which it is normally maintained to a position wherein the magnitude of a moment produced by the force about a point in the proximity of the predetermined end, is reduced.

In this arrangement an end structure is coupled to the impact redirecting structure and is adapted to apply force to the impact redirecting structure through the force acting surface portion.

A further aspect of the invention resides in a vehicle body structure for a vehicle having a longitudinal center line, comprising: a floor structure which extends along the longitudinal center line; a side member which normally extends in a direction generally parallel relationship with the longitudinal center line; and a impact redirecting structure which interconnects the floor structure and the side member so that a predetermined amount of offset is normally maintained therebetween, the impact redirecting structure including means for, in response to an impact force greater than a predetermined magnitude being applied along the side member in response to a vehicle collision, undergoing controlled deformation and pivoting the side member with respect to the floor structure to orient the side member in a direction wherein the side member is directed toward the floor and assumes a position which reduces the magnitude of a moment of force produced by the impact force about a portion of the impact redirecting structure which is located between the side member and the floor structure.

Yet another aspect resides in a method of absorbing impact energy upon an end-on collision of a vehicle having a passenger compartment and another compartment immediately adjacent the passenger compartment, comprising: subjecting a side member to vehicle collision generated force; guiding re-orientation of the side member, using a structure having a plurality of different structural strengths and which interconnects the side member and a floor structure of the passenger compartment, from a normal pre-collision orientation to one wherein the side member is, in response to the collision generated force, directed toward a point in proximity of a longitudinal end of the floor structure so as to reduce a moment of force which is produced about the point by the collision generated force acting along the side member, and transmitting the collision generated force from the side member directly toward the floor.

A further aspect of the invention resides in a vehicle body structure for a vehicle having a longitudinal center line, comprising: a floor structure which extends along the longitudinal center line; a side member which normally extends in a direction generally parallel relationship with the longitudinal center line; a side fender panel which is supported adjacent the side member; an external pre-colored, synthetic resin panel which is detachably connected to the side fender; and an impact redirecting structure which interconnects the floor structure and the side member so that a predetermined amount of offset is normally maintained therebetween, the impact redirecting structure including means for, in response to an impact force greater than a predetermined magnitude being applied along the side member in response to a vehicle collision, undergoing controlled deformation and pivoting the side member with respect to the floor structure to orient the side member in a direction wherein the side member is directed toward the floor and assumes a position which reduces the magnitude of a moment of force produced by the impact force about a portion of the impact redirecting structure which is located between the side member and the floor structure.

Yet another aspect of the invention resides in a vehicle body structure comprising: an extruded elongate hollow multi-channel force receiving and redirecting structure, the force receiving and redirecting structure having an upper connection site adapted for connection to at least one side member, and a lower connection site adapted to be disposed across and connected to a laterally extending end portion of a floor structure of a passenger cabin, the force receiving and redirecting structure comprising: elongate walls which define elongate channels therebetween, first and second pluralities of the elongate walls respectively merging at first and second elongate hub structures which extend through an interior of force receiving and redirecting structure, the elongate walls having predetermined physical properties selected to provide a plurality of different rigidity zones within the force receiving and redirecting structure which zones sequentially deform when a force, which is in excess of a predetermined magnitude, is applied to the upper connection site, causes deformation of walls immediately adjacent the upper connection site, induces the upper connection site to pivot about the first hub structure and become oriented toward the lower connection site so that force received at the upper connection site is directed toward the second hub structure and the lower direction site.

In this arrangement at least one of the side member, the cross panel, and the deformation force redirecting structure is made of a corrosion resistant light weight material which obviates the need for an externally applied corrosion preventing coating or treatment.

DESCRIPTION OF THE PREFERRED EMBODIMENTS

Referring to the accompanying drawings, a detailed description of three preferred embodiments of the present invention, is given. It should be noted however, that while each of these preferred embodiments is described in connection with a front end structure at the vehicle body which includes a front compartment, such as for example an engine room E (see FIGS. 4 and 5) it can be readily embodied into the rear end structure of the vehicle body structure. The rear end structure, as shown in FIG. 5 includes a rear compartment R.C., such as for example a luggage compartment.

Figure 1:
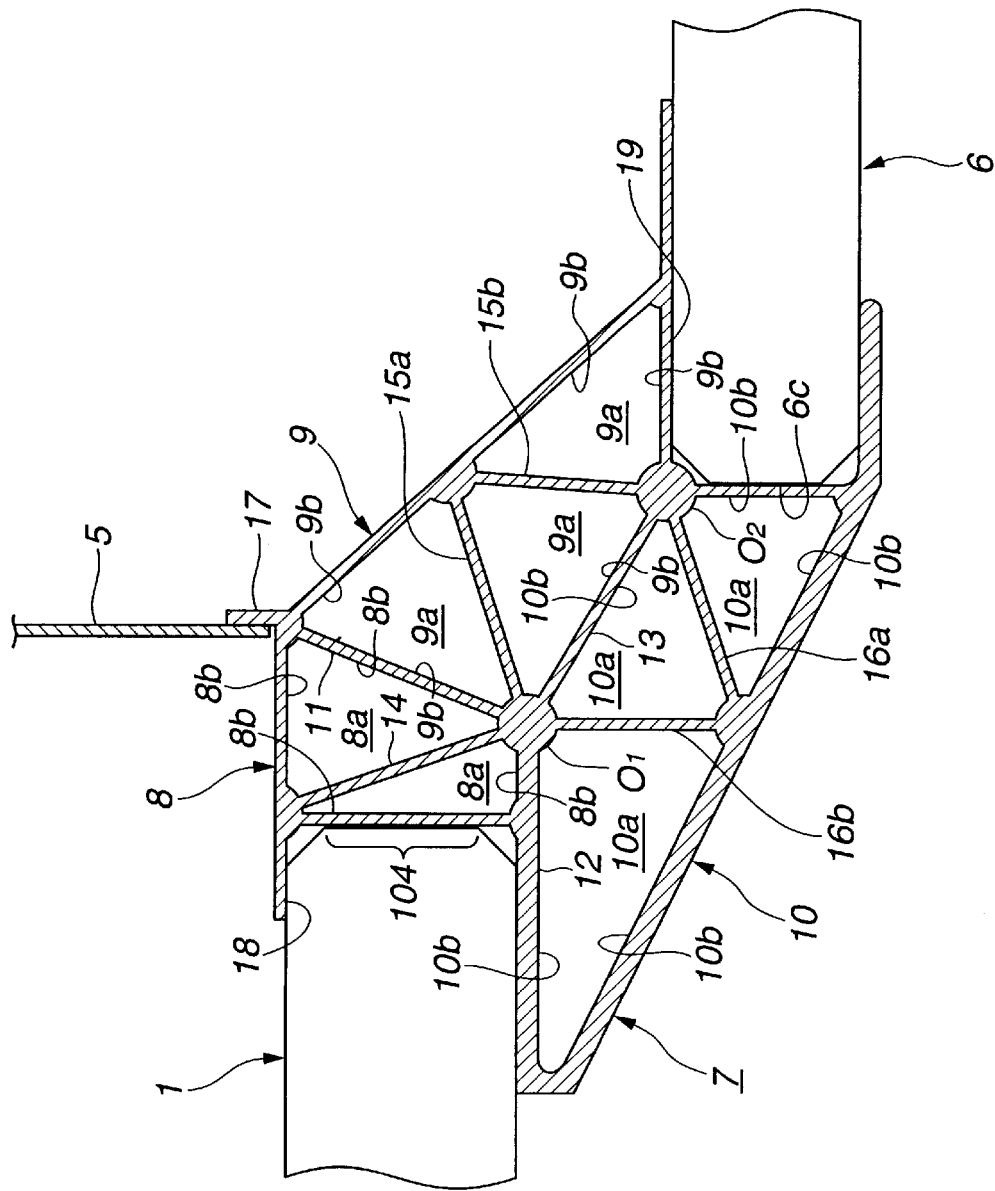
FIG. 1 is a transverse cross section of a first preferred embodiment of a deformation force redirecting structure of a vehicle body structure, according to the present invention.
Figure 4:
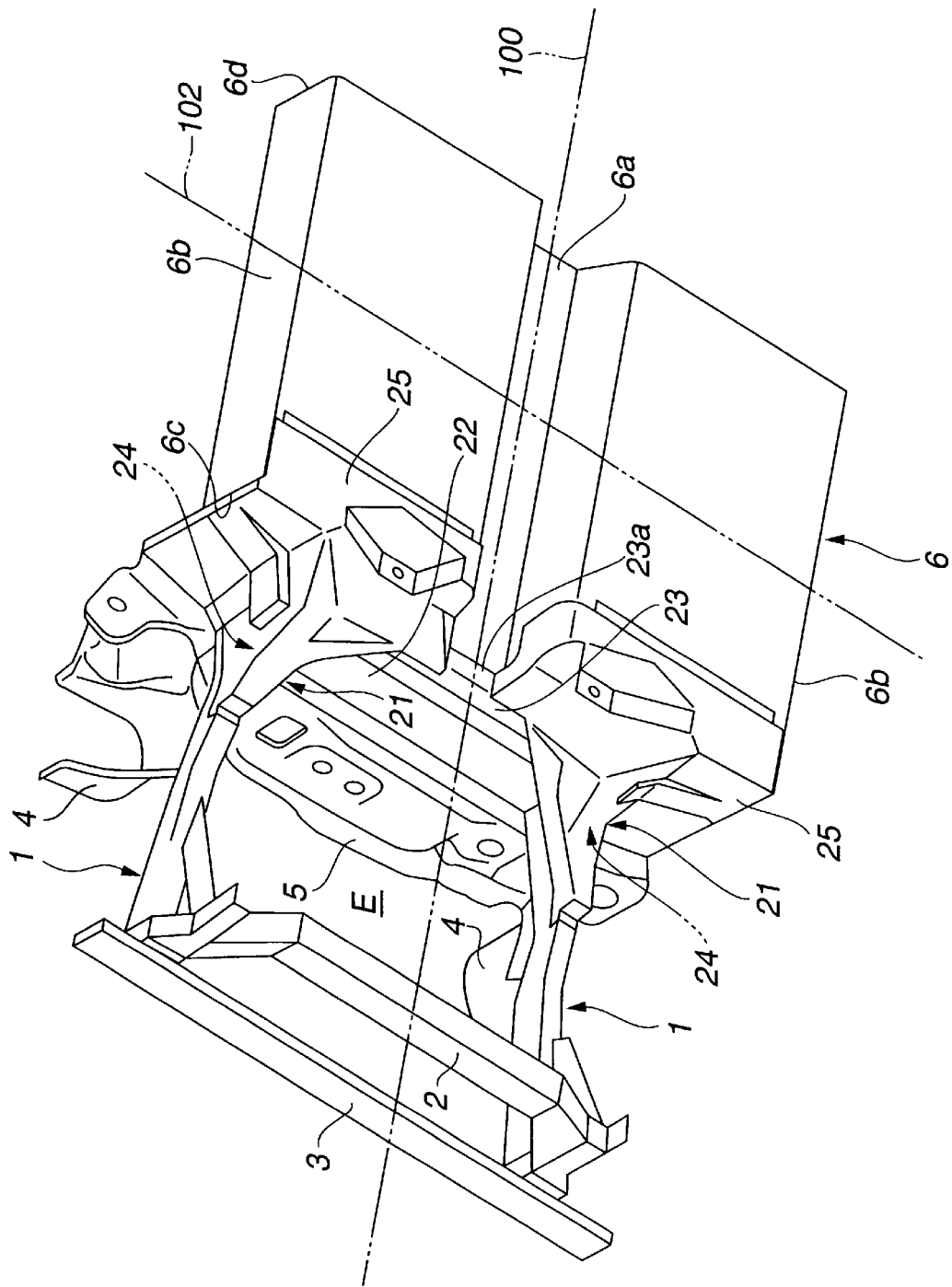
FIG. 4 is a perspective underside view of an end structure and a floor furnished with a deformation force redirecting structure according to the embodiments of the invention.
Figure 5:
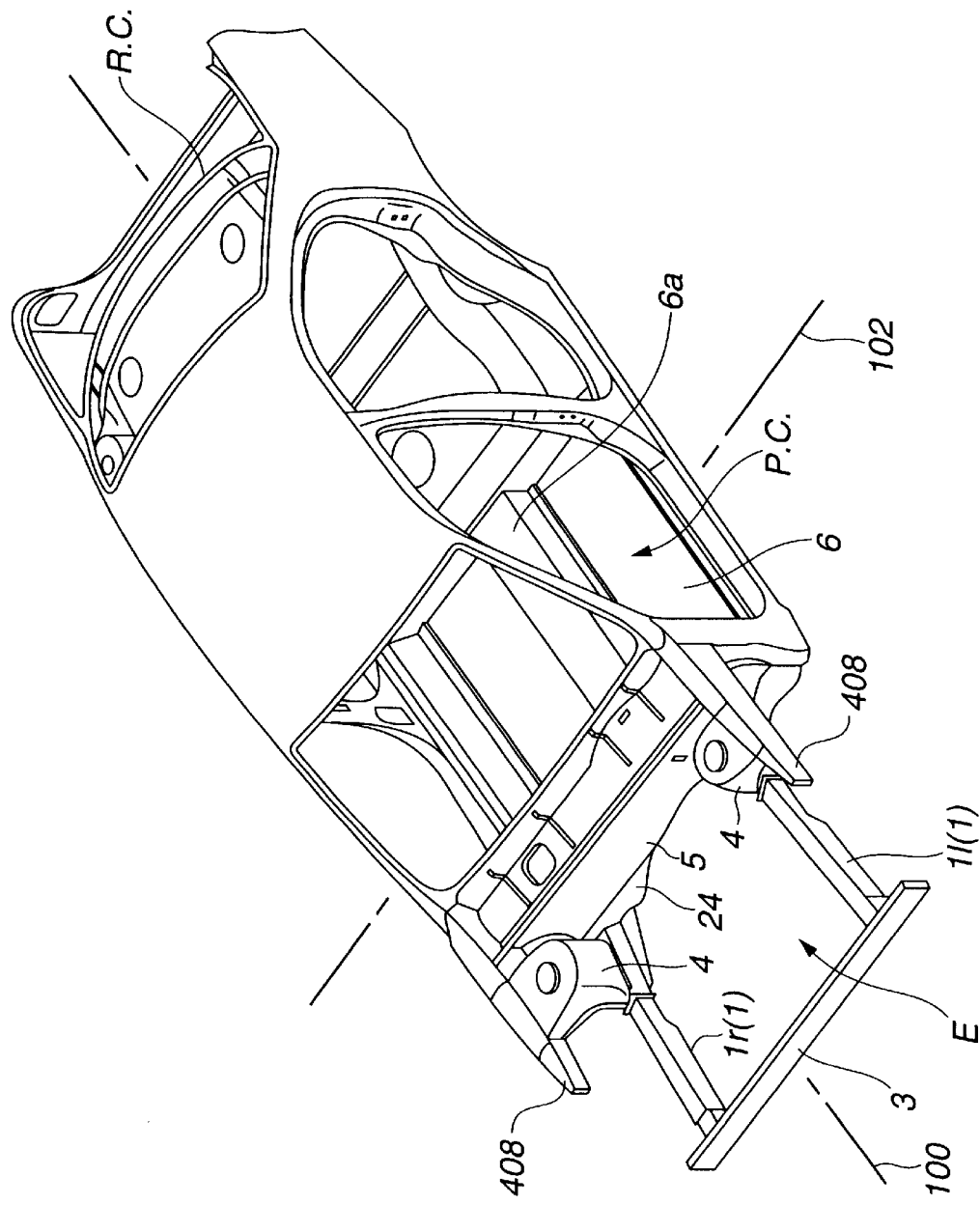
FIG. 5 is a perspective view of a vehicle body to the which the embodiments of the invention are applicable.

Referring to FIGS. 1 and 4, the front end structure includes two longitudinally extending side members 1 (viz., a left-hand front side member and a right-hand front side member). Hood ridge panels, 408 are connected to the front side members 1 to form sidewalls of a wall structure (strut housing 4) which defines the forward compartment or engine room E.

Figure 2:
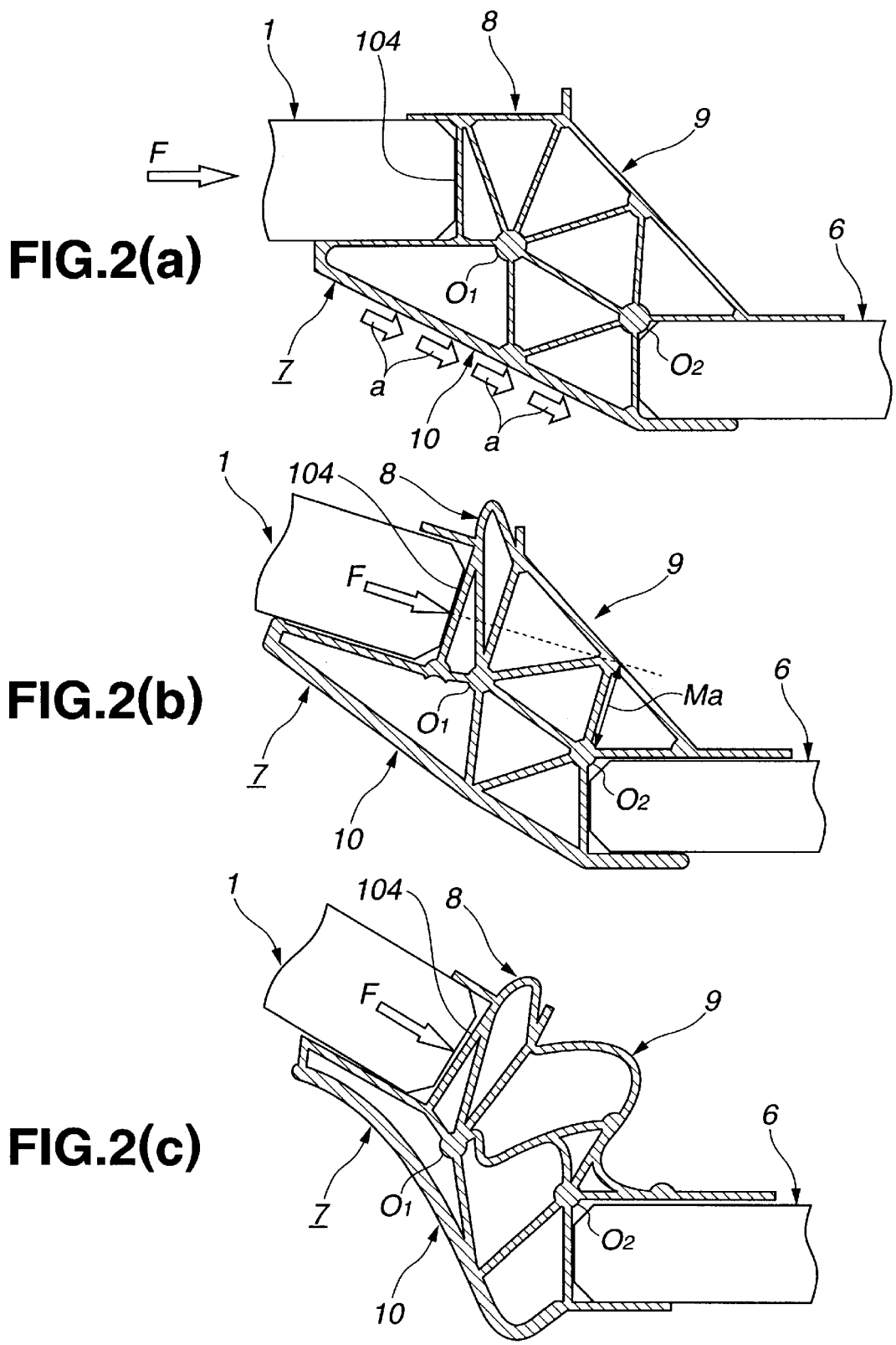
FIGS. 2(a), 2(b) and 2(c) illustrate three stages of deformation which the deformation force redirecting structure undergoes upon application of a force greater than a predetermined magnitude.

The forward portion of the vehicle includes a laterally extending structural member in the form of a first cross member 2 (best seen in FIG. 2). This first cross member 2, bridgingly interconnects the front side members 1 at portions near front ends thereof. Connected to the front ends of the front side members 1 is a bumper armature 3.

A second cross member in the form of a dash panel 5 serves as a partition between the front compartment E and a passenger compartment P.C. Two strut housings 4 are connected to rear or inboard end portions of the front side members 1, respectively. The strut housings 4 extend along not only the front side members 1, but also along the adjacent lateral edge portions of the dash panel 5, respectively, and are connected to the dash panel 5.

Referring to FIG. 4, the reference numeral 6 generally denotes a floor structure. This floor structure 6 extends along the longitudinal center line 100 as well as a laterally extending transverse line 102 crossing the longitudinal center line 100. The floor structure 6 has two ends 6c and 6d spaced along the longitudinal center line 100 and is furnished with a deformation force redirecting structure 7.

FIG. 1 illustrates a transverse cross section of the deformation force redirecting structure 7 according to the first embodiment. In this first embodiment the deformation force redirecting structure 7 consists of an elongate extruded part which is made of a corrosion resistant light weight material. In this case the material takes the form of a light metal such as for example aluminum, magnesium or even a titanium based alloy, and is formed so to have a cross-sectional profile of the nature shown in FIG. 1.

It should be noted at this point of the disclosure that the invention is not limited to the use of metal alloys and may encompass other fiber reinforced/composite materials. It is however, advantageous to use metal alloys at this time inasmuch as they can be cost effectively extruded using readily available technology and/or equipment.

Additionally, the material from which the embodiments of the invention are formed is such as to obviate the need for corrosion resistance coating or treatments and does not require painting/dipping or the like. The cost cutting ramifications of such as feature will be self-evident to one skilled in the art to which the present invention pertains.

The deformation force redirecting structure 7 extends laterally across the front end 6c of the floor structure 6 and is provided with an upright flange 17 which is adapted for connection to a lower edge portion of a dash panel 5. The deformation force redirecting structure 7 extends between the dash panel 5 and an upper surface portion of the floor structure 6 in the proximity of the front end 6c to provide an angled scuff plate or toe board surface.

The deformation force redirecting structure 7 has a socket 19 that receives the forward end 6c of the floor structure 6. Appropriate welding or bonding techniques are used to provide a fixed connection between both the dash panel 5 and the flange 17 and the socket 19 and the leading end (6c) of the floor structure 6. In this example, the deformation force redirecting structure 7 serves as a cross structural member, which is often referred to as a "dash panel cross member," which is provided to increase the stiffness and rigidity of the floor structure 6 particularly along the front end 6c thereof.

In this embodiment, the deformation force redirecting structure 7 serves as a joint between the front end structure and the floor structure 6. The deformation force redirecting structure 7 has a socket 18 that receives the front side members 1 from their rear ends. Appropriate welding or bonding techniques are used to provide a fixed connection between the wall means defining the socket 18 and the front side members 1. In this example, each of the front side members 1 is also made of extruded parts of the above mentioned corrosion resistant light material, such as exemplified by an aluminum alloy.

The deformation force redirecting structure 7 has at least two force or impact receiving surface portion (viz., one for each side member), only one being shown at 104 in FIG. 1. These force receiving surface portions are arranged to receive the force which is transmitted along the respective side member 1 which is associated therewith, during an end-on vehicular collision.

In brief, initially the force acts along the side members in a direction which is essentially parallel to the center line or axis 100. When the force exceeds a predetermined level, controlled, staged structural deformation begins to occur in the deformation force redirecting structure. This results in the redirecting of the side member (or members) from an orientation wherein it extends in the direction of the longitudinal center line 100, to an orientation wherein it is angled toward the floor structure 6 so to direct the force thereto.

In more detail, in this first embodiment, the deformation force redirecting structure 7 has two force receiving surface portions 104. They are spaced in the longitudinal direction of the deformation force redirecting structure 7. As seen from FIG. 1, there is a vertical offset between each of the rear or inboard ends of the front side members 1 and the floor structure 6. Thus, the force receiving surface portion 104 is, in this example, spaced from the front end 6c of the floor structure 6 in a first or forward, direction which is essentially parallel to the longitudinal center line 100 and elevated in a second vertical direction normal to a horizontal flat plane that includes the longitudinal center line 100 and the transverse line 102 (see FIGS. 4 and 5).

The deformation force redirecting structure 7, is in this embodiment, divided into a first section 8, a second section 9 and a third section 10. The first, second and third sections 8, 9 and 10 have distinct functions as will become apparent as the discussion proceeds.

The first section 8 supports the force receiving surface portions 104 in predetermined positions of the nature illustrated in FIG. 1. Also, as shown in FIGS. 2(a) and 2(b), the deformation force redirecting structure 7 is so constructed and arranged that when one or both of the force receiving surface portions 104 is subjected to force F greater than a predetermined magnitude, the force F causes the first section 8 to deform and move the force receiving surface portion 104 to which the large deforming force is applied, away from the predetermined position thereof, in such a direction as to reduce the magnitude of moment about a portion $O_2$ which is located proximate the front end 6c of the floor structure 6.

To simplify the disclosure, only one of the two side member/deformation force redirecting structure arrangement will be discussed in detail. It will of course, be understood that, in the case of a partial head-on collision, only one of the side members may be subjected to a force sufficiently large as to induce deformation of that end of the force redirecting structure arrangement with which it is associated. On the other hand, in the case of a full head-on collision both side members would tend to be subjected to the excessive force loads and both ends of the laterally extending deformation force redirecting structure arrangement would be deformed.

The above-mentioned moment is expressed as F×Ma, wherein F is the magnitude of force and Ma is the length of arm that is expressed as the minimum (perpendicular) distance between the portion $O_2$ and a straight line passing at right angles through the force receiving surface portion 104. It will be appreciated that the length of arm Ma is considerably reduced as the force receiving surface portion 104 is displaced forwardly and down from the normal predetermined position in which it is supported. In this example, in the normal predetermined position illustrated in FIG. 1, the force receiving surface portion 104 has its normal surface vector lying in parallel to the longitudinal center line 100.

As depicted in FIG. 1, each of the force receiving surface portions 104 is arranged to be vertically oriented. If desired, however, such force receiving surface portions may extend out beyond the outer periphery wall of the deformation force redirecting structure 7.

As best seen in FIG. 1, the first section 8 extends across imaginary extensions of the rear ends portions of the front side members 1 and is located between the rear ends of the front side members 1 and the dash panel 5. The second section 9 is seated on an upper surface portion of the floor structure 6 in the proximity of the front end 6c and extends therefrom to the first section 8. The third section 10 is seated against the front end 6c of the floor structure 6 on one hand and on a lower surface portion of each of the front side members 1 in the proximity of the rear end thereof on the other. The third section extends from the front end 6c of the floor structure 6 toward the front side members 1. The third section 10 extends under the first section 8 and the second section 9.

The deformation force redirecting structure 7 includes a first partition 11 separating the first and second sections 8 and 9 from each other. A second partition 12 separates the first and third sections 8 and 10 from each other. A third partition 13 separates the second and third sections 9 and 10 from each other.

The first and second sections 8 and 9 are arranged in tandem so as to stepwisely provide a first force transmission path from the rear ends of the front side members 1 to the upper surface portions of the floor structure 6 in the proximity of the front end 6c. The third section 10 provides a second force transmission path from the lower surface portions of the front side members 1 in the proximity of the rear ends thereof to the front end 6c of the floor structure 6. This arrangement provides excellent force transmission from the front side members 1 to the floor structure 6 when the front side members 1 are subjected to force during a head-on type end collision of the vehicle.

Accordingly, the amount of bending force which is applied to the rear end portions of the front side members 1 is reduced to a sufficiently low level with the result that each of the front side members 1 can deform in a collapsible manner along its longitudinal direction.

The deformation force redirecting structure 7 is so designed as to undergo a predetermined deformation, which is considered to be desirable to transmit a great part of force to the floor structure 6 with little or no moment around a hub $O_2$ in the proximity of the front end 6c of the floor structure 6.

To accomplish this predetermined sequence of deformations of the deformation force redirecting structure 7, the structural rigidities of the first, second and third sections 8, 9 and 10 are controlled. The setting is such that the first section 8 is lower, in rigidity, than the third section 10, the second section 9 is lower in rigidity than the third section 10, while the second section 9 is higher in rigidity than the first section 8. In other words, the first section 8 exhibits the lowest in rigidity, while the third section 10 is the highest in rigidity, and the second section 9 is higher, in rigidity, than the first section 8 but lower than the third section 10.

The adjustment of rigidity of each section of the deformation force redirecting structure 7, may be achieved by altering the transverse cross-sectional structural portion and/or profile and/or altering the thickness of the walls which separate the channels which are formed during the extrusion of member. In this preferred embodiment, reinforcement walls 14, 15a, 15b, 16a, and 16b are provided to endow/adjust the necessary rigidities to the first, second and third sections, 8, 9 and 10, respectively.

As best seen in FIG. 1, the first section 8 includes a first channel 8a with a common cross-sectional profile and first walls 8b defining the first channel 8a. The second section 9 includes a second channel 9a with a common cross-sectional profile and second walls 9b defining the second channel 9a. The third section 10 includes a third channel 10a with a common cross-sectional profile and third walls 10b defining the third channel 10a.

The first section 8 is designed such that, upon application of a longitudinally acting force F to the force receiving surface portion 104 from the associated front side member 1, the upper wall of the first section 8 is deformed before deformation of the other parts or portions.

In general, with the same length and thickness, the buckling strength of a flat wall is inversely proportional to its width. This width dependent buckling parameter is utilized, so that the width of the lower wall is set shorter than the width of the upper wall. Thus, the partition 11 is inclined rearwardly viewing in FIG. 1.

In order to facilitate deformation of the upper wall of the first section 8, the reinforcement wall 14 is provided. A lower edge of, the reinforcement wall 14 is connected to a hub-like hub Or hub $O_1$, while, upper edge is connected to a joint arranged where the upper wall meets the upright wall on which the force receiving surface portion 104 is formed. To provide the hub $O_1$ with sufficient strength to support the reinforcement wall 14, the partition 13 merges with and interconnect hub $O_1$ and hub $O_2$. Hub $O_2$ is located adjacent an upper edge of the forward end 6c of the floor structure 6.

The reinforcement walls 16b and 15a, extend out from the hub $O_1$, while, the reinforcement walls 15b and 16a extend out from the hub $O_2$. The reinforcement walls 15a and 15b merge on the upper wall of the second section 9 to form a first triangular profile in cooperation with the partition 13. The reinforcement walls 16a and 16b merge at the lower wall of the third section 10 to form a second triangular profile in cooperation with the partition 13.

Among these walls, the reinforcement walls 15b and 16b extend vertically, i.e., in the same direction as the force receiving surface portion 104 and the front end 6c of the floor structure 6. The vertically extending reinforcement wall 16b connected to the hub $O_1$ provide increased strength in supporting the reinforcement wall 14.

According to the first preferred embodiment, the deformation force redirecting structure 7 provides a joint or connection structure with sufficiently high rigidity to enable the connection of the rear end portions of the front side members 1 and the front end portion of the floor structure 6.

As previously mentioned, according to the first preferred embodiment, the first and second sections 8 and 9 are arranged in tandem to provide a first force transmission path from the rear ends 104 of the front side members 1 to the upper surface portions of the floor structure 6 in the proximity of the front end 6c thereof. The third section 10 provides a second force transmission path from the lower surface portions of the front side members 1 in the proximity of the rear ends thereof to the front end of the floor structure 6.

This arrangement provides excellent force transmission from the front side members 1 to the floor structure 6 when the front side members 1 are subjected to force during end collision of the vehicle. Accordingly, bending force applied to the rear end portions of the front side members 1 is reduced to a sufficiently low level so that each of the front side members 1 can deform in a collapsible manner along its longitudinal length.

As a result, this arrangement provides an increased period of time during which the front side members 1 is deformed in its longitudinal direction under compression force during end collision of the vehicle. This period of time is herein referred to as "a collapsible engine room stroke". The increase in the collapsible engine room stroke results in an increase in impact energy absorption.

As alluded to above, the first preferred embodiment is such that the deformation force redirecting structure 7 is formed via extrusion using a corrosion resistant light weight material and is used as a dash panel cross member to increase the rigidity of the floor structure 6. This provides an increased rigidity at the front end portion of the floor structure 6, resulting in increased capability of the front end portion of the floor structure 6 in holding its shape under increased force. The level of reaction of the front side members 1 is elevated, thus achieving an appreciable increase in impact energy absorption. If the front side members 1 and the floor structure 6 are also formed by extrusion/die casting from the same type of light weight corrosion resistant material, the above-mentioned effectiveness become more remarkable with an attendant marked saving in weight.

Referring to FIGS. 2(a), 2(b) and 2(c), upon application of force F to the front side members 1 during end collision of the vehicle, a great portion of the force F is transmitted to the floor structure 6 though the second transmission path in the manner illustrated by small arrows a in FIG. 2(a). Since the deformation force redirecting structure 7 has minimized the distance, in a direction along the longitudinal center line, between the rear ends of the front side members 1 and the front end 6c of the floor structure 6, the force F is effectively transmitted to the floor structure 6.

More specifically, the upper wall of the first section 8 is extensively deformed as illustrated in FIG. 2(b), causing pivotal movement of the force receiving surface portions 104 away from the predetermined upright positions of FIG. 2(a) in such a manner as to reduce the magnitude of moment about the hub $O_2$ (see FIG. 2(b)).

Assuming a surface vector normal to each of the force receiving surface portions 104 and an inversed vector displaced through 180 degrees from the surface normal vector, the inversed vectors originating at the force receiving surface portions 104 are directed in a direction parallel to the longitudinal center line 100 when the force receiving surface portions 104 are in their predetermined upright positions (FIG. 2(a). During a shift from the state of FIG. 2(a) to the state of FIG. 2(b), the inversed vectors move clockwise about the hub $O_1$ to become oriented toward hub $O_2$. This movement of the force receiving surface portions 104 causes a reduction in the length of the moment arm Ma.

Subsequently, the above-mentioned deformation of the first section 8 triggers sequential collapsible deformation of the second section 9 and collapsible deformation of the third section 10 as illustrated in FIG. 2(c).

The above-mentioned reduction in length of moment arm Ma due to a shift from the state of FIG. 2(a) to FIG. 2(b) prevents or at least restrains rotational movement of the deformation force redirecting structure 7 and the dash panel 5 toward the passenger compartment at a level higher than the floor structure 6.

Since the rear end portions of the front side members 1 are not bent and are oriented toward the hub $O_2$, each of the front side members 1 is deformed in a collapsible manner in the process of impact energy absorption during end collision.

Figure 8:
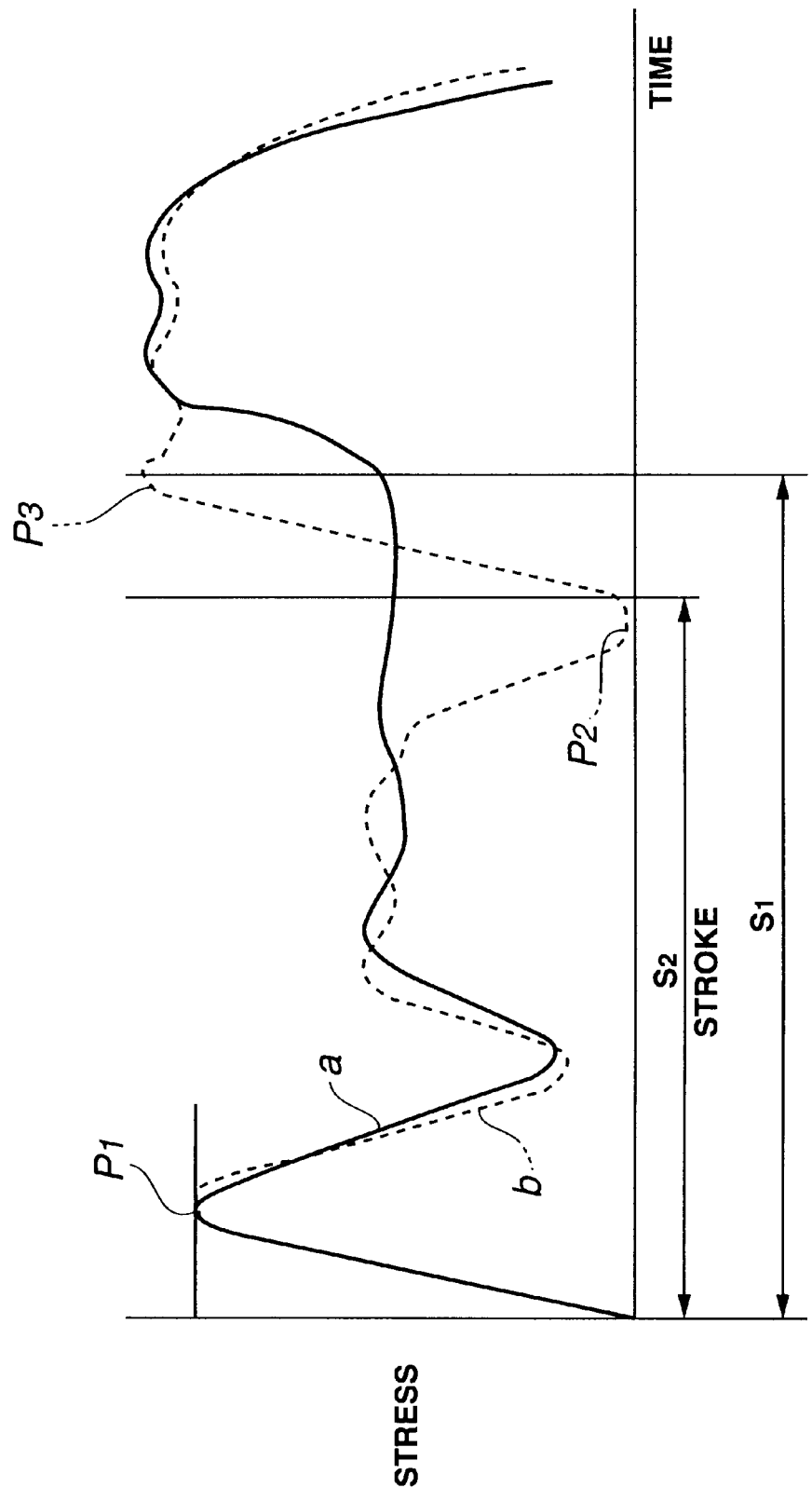
FIG. 8 illustrates stress versus time characteristic curves generated during a frontal head-on vehicular collision.
Figure 9:
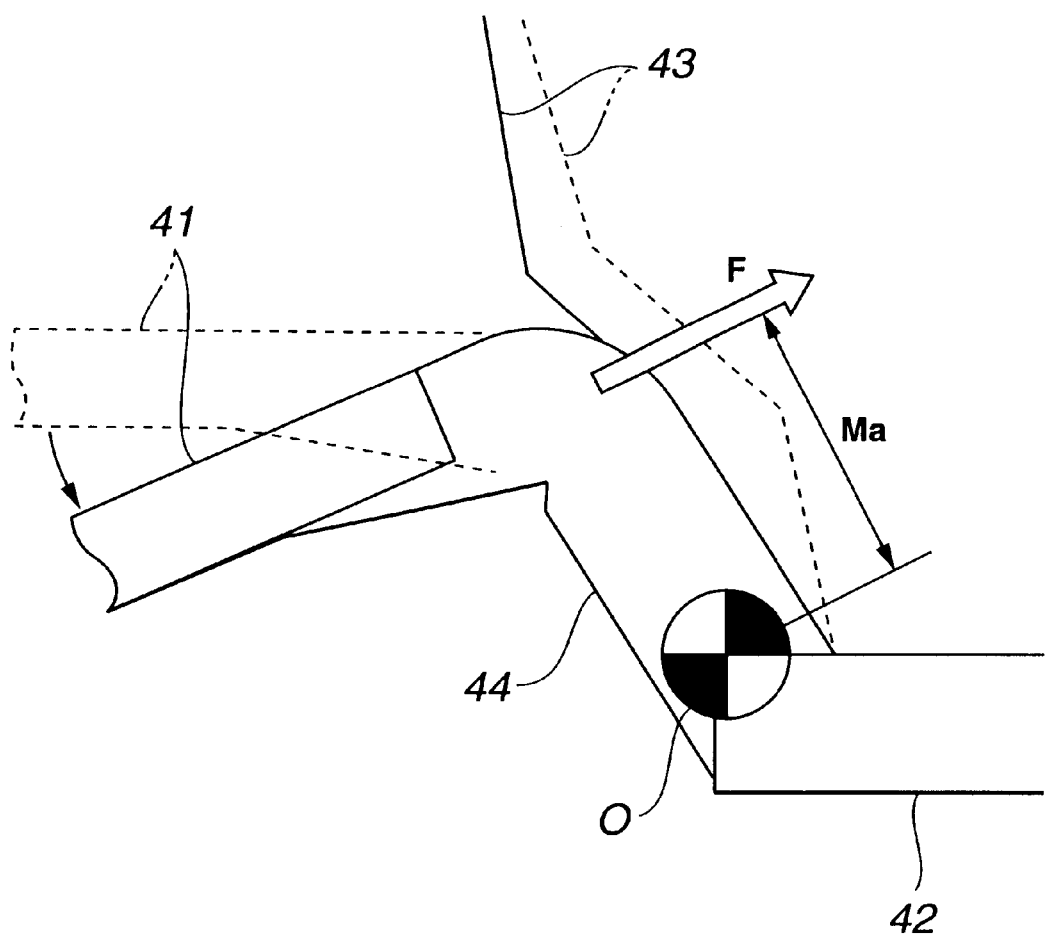
FIG. 9 is a diagrammatic view of a portion of a vehicle body depicting the results produced with the stress versus time characteristic b shown in FIG. 7.

Referring to FIG. 8, the fully drawn line a illustrates the first preferred embodiment, and the broken line drawn curve b illustrates the variation of force versus time during frontal head-on collision or crash of a vehicle, which employs a conventional structure of type as illustrated in FIG. 9. In FIG. 9, the reference numeral 41 designates a front side member connected via a joint 44 to a portion of a floor 42 in the proximity of a front end thereof, while the reference numeral 43 designates a dash panel. The solid line outline in FIG. 9 illustrates the manner in which the rear end portion of the front side member 41 is bent in the process of impact energy absorption. On the other hand, the fully drawn curve a in FIG. 8 illustrates the variation of force versus time during the same frontal head-on collision of a vehicle, which employs the structure shown in FIG. 1. In FIG. 8, the reference character P1 indicates a peak of force during collapsible deformation of an engine room. The reference character P2 indicates a drop of reaction caused by the bending of rear end portions of two front side members 1 (see FIG. 9). The reference character P3, however, indicates the variation of reaction due to deformation of surrounding panels including a dash panel 5, which stage comes after collapsible deformation of the engine room.

The reference character S2 indicates the engine room collapsible stroke of the vehicle body using the structure of FIG. 9. The reference character S1 indicates the engine room collapsible stroke of the vehicle body using the structure illustrated and discussed in connection with FIG. 1. As will be appreciated, the first preferred embodiment a yields a gain in engine room collapsible stroke (S1–S2). This causes an increase in impact energy absorption due to the collapsible deformation of the engine room. As a result, the deformation of the surrounding panels including the dash panel 5 are considerably reduced, thereby to ensure a sufficiently wide occupant space within the passenger compartment.

According to the first preferred embodiment of the present invention, the upper wall of the first section 8 is lower in rigidity than the lower wall thereof, and the lower wall of the first section 8 is supported with sufficiently high strength. Thus, application of force on the force receiving surface portions 104 initiates buckling of the upper wall of the first section 8 prior to buckling of the lower wall thereof. The deformation of this type causes movement of the force receiving surface portion 104 away from the predetermined position of FIG. 2(a) to the position of FIG. 2(b), making it possible to control deformation in the desired mode.

Thus, in accordance with the first preferred embodiment of the invention, the reinforcement walls 14, 15a, 15b, 16a, and 16b are used to adjust the rigidity and strength of the first, second, and third sections 8, 9, and 10. The use of such reinforcement walls makes it easy to select/adjust the desired deformation mode.

Further, the first section 8 includes the diagonal reinforcement wall 14 to facilitate deformation of the upper wall thereof. At one side, the reinforcement wall 14 is connected to the hub $O_1$, while, at the other side, it is connected to a joint where the upper wall meets the upright wall on which the force receiving surface portion 104 is formed. To give the hub $O_1$ strength sufficient to support the diagonal reinforcement wall 14, the partition 13 interconnects the hub $O_1$ and the hub $O_2$. In addition to this, the vertically extending reinforcement wall 16b provides increased strength in supporting the diagonal reinforcement wall 14. During deformation, the diagonal reinforcement wall 14 rotates about the hub $O_1$ to promote buckling deformation of the upper wall 8b in the process of deformation initiated by application of force F on the force receiving surface portions 104. The diagonal reinforcement wall 14 serves as a wiper or guide wall for promotion of the buckling deformation of the upper wall of the first section 8. Accordingly, the provision of the diagonal reinforcement wall 14 ensures desired deformation of the first section 8.

Accordingly, with the first preferred embodiment of the invention, the deformation force redirecting structure 7 serves as an excellent connection member and also facilitates easy assembly with the floor structure 6 and the front side members 1. The sockets 18 and 19 of the deformation force redirecting structure 7 further facilitate the assembly.

Second Embodiment

Figure 3:
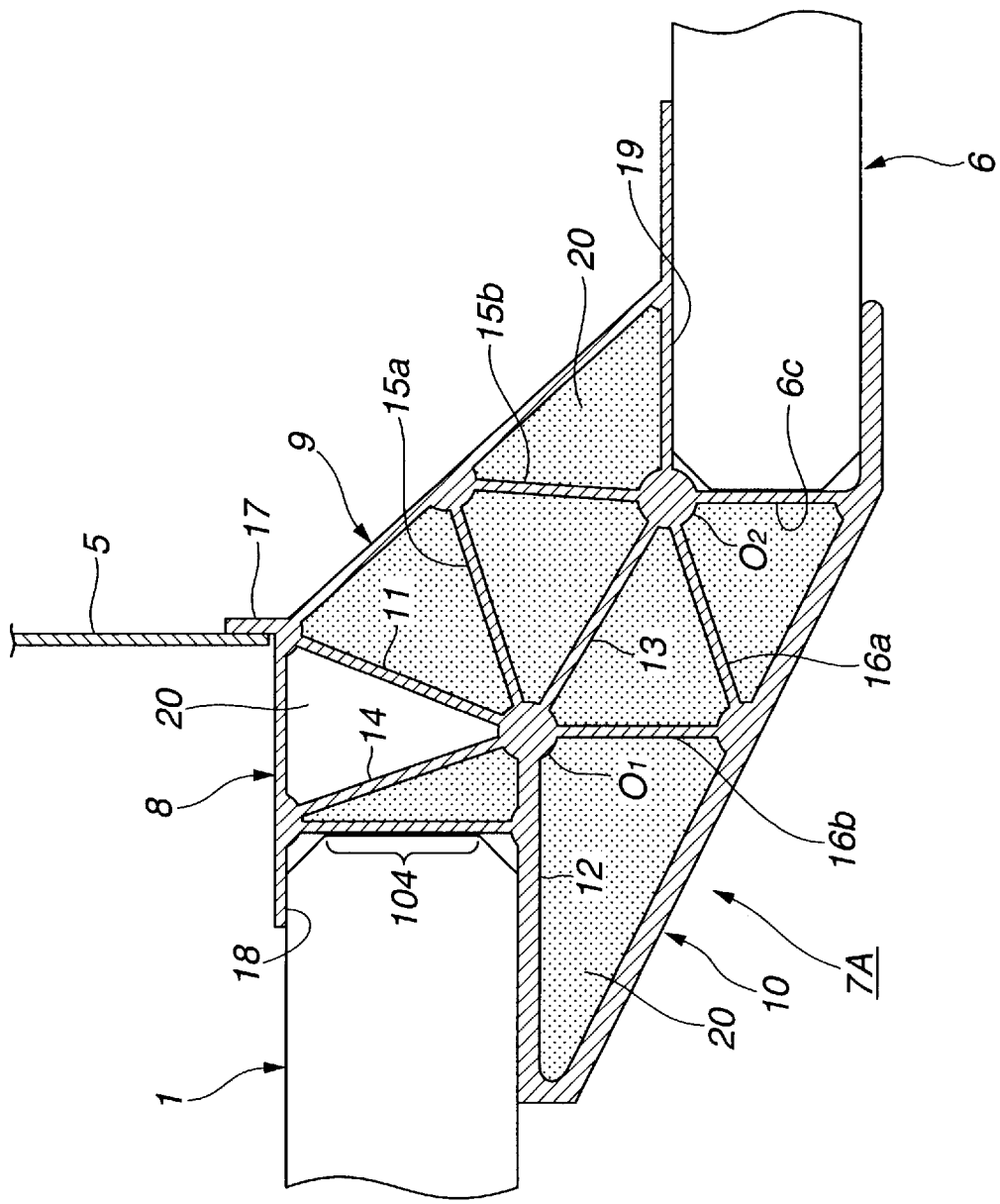
FIG. 3 is a view similar to FIG. 1, illustrating a second preferred embodiment of the present invention.

FIG. 3, shows a second preferred embodiment of the invention. In this embodiment, a deformation force redirecting structure 7A is substantially similar to the deformation force redirecting structure 7 according to the first preferred embodiment with the exception that filler 20 is used to fill selected channels of the plurality of elongate channels defined in the extruded structure. This enables the rigidity and strength of the first, second and third sections 8, 9 and 10, to be further adjusted through the use of a synthetic resin filler which is filled into the channels within each of the sections 8, 9 and 10. It is of course possible to use different types of material (or different densities or the like of the same material) for the filler used in each of the sections and/or to further selectively modify the deformation characteristics of sub-sections within each "main" section or zone/structural portion. In this instance, by leaving the channel 8a unfilled in the manner illustrated, it is possible to reduce the structural resistance of this portion of the structure relative to the other sections, and thus render it more readily crush/deformable than those which are filled.

This feature in combination with control of the thickness/length of each of the walls which bound the channels which are filled/left empty, enables, as alluded to above, the deformation characteristics of each section to be finely tuned and ensure that the sequence of deformation follows that which will best ensure that kinetic energy/stress forces will be absorbed/re-directed and that the deformation of the structural panels and the like which are associated with the passenger cabin are controlled in a manner which promotes occupant safety.

Third Embodiment

Figure 6:
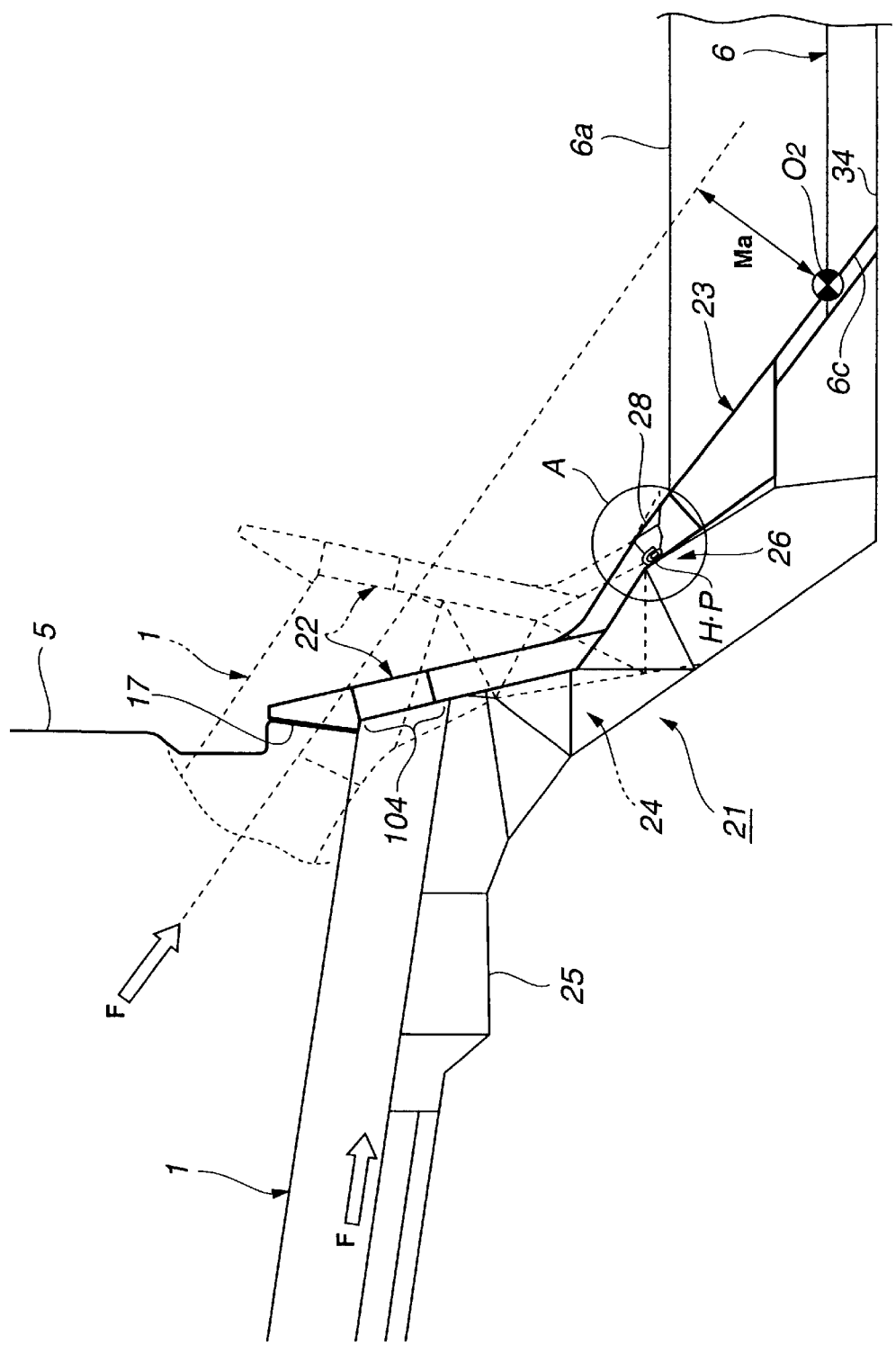
FIG. 6 is a diagrammatic transverse cross section of a deformation force redirecting structure of a vehicle body structure, illustrating the conceptual arrangement of a third preferred embodiment of the present invention.
Figure 7:
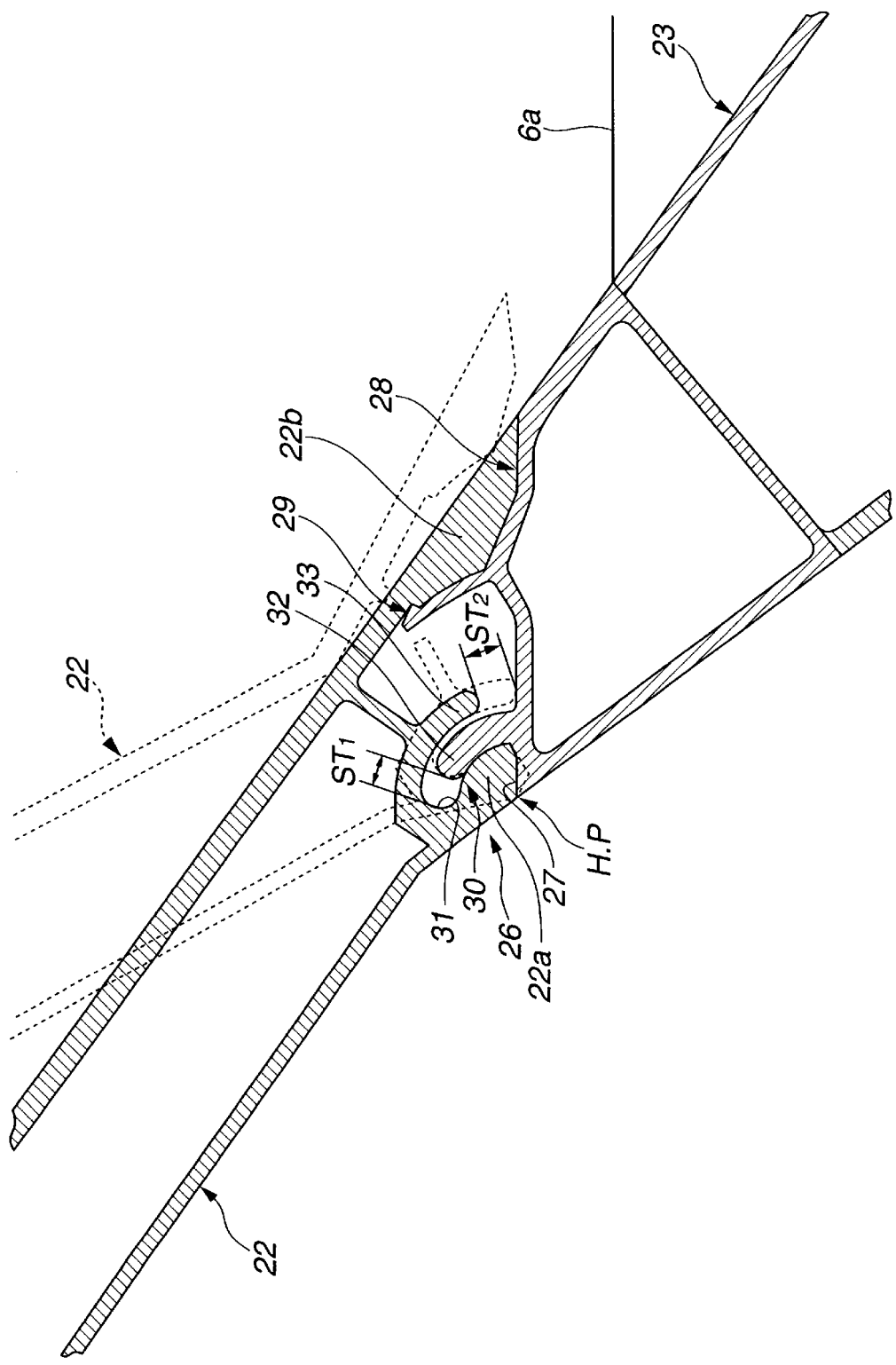
FIG. 7 is an enlarged sectional view of a portion enclosed by circle A in FIG. 5.

FIGS. 5 to 7 show a third preferred embodiment of the invention. In this embodiment, front side members 1 and a floor structure 6 are made of an extruded light weight corrosion resistant material such as aluminum alloy or the like. In this embodiment, the floor structure 6 and the side members are interconnected by a deformation force redirecting structure generally denoted by the numeral 21.

FIG. 7 illustrates a cross section of the deformation force redirecting structure 21. This deformation force redirecting structure 21 includes a first section 22, a second section 23, and a third section 24. These sections 22, 23 and 24 correspond, generally in function, to their counterparts in the deformation force redirecting structure 7, respectively. Each of the first and second sections 22 and 23 is an elongate extruded part of light weight metal such as for example aluminum alloy, with an uniform transverse crosssectional profile as shown.

Referring also to FIG. 4, the elongate first and second sections 22 and 23 lie across a front end 6c of the floor structure 6. The first section 22 has an upright flange 17 for connection to a lower edge portion of a dash panel 5. The first and second sections 22 and 23 of the deformation force redirecting structure 21 extends between the dash panel 5 and a surface portion of the floor structure 6 in the proximity of the front end 6c to provide a toe board/foot rest surface.

The second section 23 of the deformation force redirecting structure 21 has a socket 34 which receives the floor structure 6 from the front end 6c and is formed with a notch or gap 23a to avoid interference with a central tunnel 6a of the floor structure 6. The second section 23 extends from the front end of the tunnel 6a to the front end of each of side sills 6b and in abutting engagement therewith. Appropriate welding, bonding or the like type of fastening technique is used to respectively provide a fixed connection between the dash panel 5 and the flange 17 of the first section 22; a fixed connection between the wall means defining the socket 34 and the floor structure 6; a fixed connection between the second section and the front end of the tunnel 6a; and a fixed connection between the second section 23 and the front end of each of the side sills 6b.

The first and second sections 22 and 23 of the deformation force redirecting structure 21 serves as a dash panel cross member to provide high stiffness and rigidity to the floor structure 6. The third section 24 is constructed of a plurality of reinforcement parts, such as for example, a plurality of interconnected stamped parts or die-cast parts or a mixture thereof.

Referring to FIGS. 4 and 6, the third section 24 is separated into two divisions by the tunnel 6a. The two divisions of the third section 24 extend from the floor structure 6 toward rear end portions of the front side members 1, respectively. In the third preferred embodiment, each of the two divisions of the third section 24 is fixedly connected, by appropriate welding, bonding, or the like type of fastening technique, to the floor structure 6 and extends toward the associated one of the front side members 1 to provide a support on which the rear end portion of the associated front side member 1 fixedly rests by appropriate welding technique. Accordingly, similarly to the first preferred embodiment, the third section 24 provides a force transmission path from the associated front side member 1 to the floor structure 6.

As best seen in FIG. 7, at a lower end, the first section 22 seats on an upper end of the second section 23 within a horizontal common flat interface plane. A hinge joint, generally denoted by the numeral 26, is used to allow angular movement of the first section 22 relative to the second section 23. The hinge joint 26 includes first and second spaced seats 27 and 28 that are formed on the second section 23 and disposed in the common flat interface plane. The first section 22 includes flanges 22a and 22b which are snugly disposed on spaced seats 27 and 28, respectively. In this embodiment, these spaced seats are referred to as forward and rearward seats 27 and 28 inasmuch as they are spaced along the longitudinal center line 100 and the seat 28 is located nearer the passenger compartment than the seat 27.

A shown in FIG. 7, the hinge joint 26 has a hinge pin axis H.P defined at a front edge of the forward seat 27. The rearward seat 28 serves as a stop in cooperation with the mating flange of the first section 22 for holding the first section 22 in the predetermined position relative to the second section 23.

In order to prevent disengagement of the first section 22 from the forward seat 27, a hook feature 29 extends forward from the second section 23 into a space between the flanges of the first section 22 and engages a shoulder formed on an inner forward edge of the rearward flange.

The first section 22 is displaceable in a rotational direction about the hinge pin axis H.P. To guide this rotation and to limit amount of angular displacement, a rotation guide and limit 30 is provided. This arrangement acts as type of lost motion connection with permits a limited amount of movement before engagement and resistance to further movement is produced.

The rotation guide and limit 30 includes an arcuately curved elongate flange member 32 extending from a portion of the upper end of the second section 23 adjacent the rear boarder of the front seat 27. This arcuately curved flange member extends into an arcuately shaped groove 31 in the illustrated manner.

The groove 31 includes two opposed cylindrical sidewalls that have radii of curvatures originated at a first common center point. The arcuate flange 32 has two parallel cylindrical inner and outer walls that have radii of curvatures originated at a second common center point. The sidewalls of the arcuate groove 31 are spaced so as to allow limited radial movement of the flange 32 and the first and second common center points are placed at different locations. Thus, when the first section 22 is forced to rotate about the hinge pin axis H.P, the rearward flange of the first section 22 can smoothly slide on the seat 28 formed on the second section 23.

The rotation guide and limit 30 also includes a second arcuately shaped flange 33 that defines the outer sidewall of the arched groove 31 and extends toward the upper end of the second section 23.

In the position illustrated in FIG. 7, the leading end of the arcuate flange 32 is spaced from the bottom of the arched groove 31 by a first angular distance or stroke $ST_1$, while the leading end of the second arcuate flange 33 is spaced from the upper end of the second section by a second angular distance or stroke $ST_2$. The setting is such that the first stroke $ST_1$ is approximately the same as the second stroke $ST_2$. The strokes determine the amount of rearward angular displacement of the first section 22 relative to the second section 23 inasmuch as the angular movement is limited when the arcuate flange 32 engages the bottom of the arched groove 31 and the second arcuate flange 33 engages the upper end of the second section 23.

As shown in FIG. 6, at portions near the upper end of the first section 22, the deformation force redirecting structure 21 has force receiving surface portions 104 which is disposed in abutting engagement with the rear ends of the front side members 1.

Referring back to FIG. 7, an appropriate welding, or suitable other fastening technique (not excluding rivets, fastener, bond or the like) is used to provide a fixed connection between the seat 27 of the second section 23 and the associated flange 22b of the first section 22 and a fixed connection between the seat 28 and the associated flange 22a. The welds (as they will be referred to for simplicity and which are not shown per se) are formed so that they break when the force receiving surface portions 104 are subject to force greater than a predetermined magnitude.

According to this third preferred embodiment, the first and second sections 22 and 23 are arranged in tandem to provide a first force transmission path from the rear ends 104 of the front side members 1 to the front end portion of the floor structure 6, while the third section 10 provides a second force transmission path from the lower surface portions of the front side members 1 in the proximity of the rear ends thereof to the front end portion of the floor structure 6. This arrangement provides excellent transmission of force from the front side members 1 to the floor structure 6 when the front side members 1 are subjected to force during end collision of the vehicle. Accordingly, bending force applied to the rear end portions of the front side members 1 is reduced to a sufficiently low level so that each of the front side members 1 is deformed in a collapsible manner in its longitudinal direction.

In operation, the above described structure is such that when a large force such as that which is produced in response to a head-on vehicular collision, is transmitted along the side members, the welds or the like type of connections at the seats 27 and 28 are broken to allow a rearward angular (pivotal) movement of the first section 22 to the inclined position as illustrated by the broken line in FIG. 6. The rotation guide and limit 30 limits the amount of this angular displacement.

This angular displacement causes each of the force receiving surface portions 104 to be displaced from its predetermined position illustrated in FIG. 6. This causes the rear end portions of the front side members 1 to alter their orientation from their essentially horizontal position to one wherein they are angled downwardly toward a hub $O_2$. This causes a reduction in moment arm Ma.

The above-mentioned reduction in moment arm Ma prevents or at least restrains rotational movement of the deformation force redirecting structure 21 and the dash panel toward the passenger compartment above the floor structure 6.

Since the rear end portions of the front side members 1 are not bent and are oriented toward the hub $O_2$, each of the front side members 1 is subjected to collapsible deformation in its longitudinal direction during end collision of the vehicle.

Further, in accordance with this third preferred embodiment, the hinge joint 26 assures the predetermined angular displacement of the first section 22 during end collision of the vehicle, making it easy to control the ensuing deformation. The second section 23, which supports this angular displacement, is fixedly connected to the side sills 6b and the floor tunnel 6a. Thus, force applied to the second section 23 is transmitted to the side sills 6b and the floor tunnel 6a. Accordingly, displacement of the second section 23 toward the passenger compartment is prevented, making it easier to accomplish the desired deformation control mode.

It should be noted that during the pivotal movement of the first member 22, a web (no numeral), which interconnects the arcuate flange 33 and the upper wall member of the first member 22, is engaged by and broken by contact with the leading end of the flange member on which the hook feature 29 is formed. This of course additionally absorbs impact energy further improving the effect of this embodiment.

The extruded nature of the first and second sections 22 and 23 which constitute the dash panel cross member, again provides increased stiffness and rigidity to the floor structure 6. Additionally, altering the height and inclined angle of the first and second sections 22 and 23 enables different offset relationships in height and in longitudinal distance between the front side member 1 and the floor structure 6, to be taken into account and compensated for. Accordingly, the deformation force redirecting structure 21 according to the third preferred embodiment provide the desired deformation control without requiring a large amount of space for installation of a dash panel cross member.

Further, the first and second sections 22 and 23 do not require any separate hinge joint elements or parts and thus reduce manufacturing cost. However, the present invention is not so limited and if desired, special hinge elements may be used to provide a joint between the first and second sections.

In the third preferred embodiment, the front side member 1 and the floor structure 6 are constructed of extruded parts of aluminum alloy.

In each of the preferred embodiments, the deformation force redirecting structure has been discloses ad being provided at the front end of the floor and cooperates with front side members. The deformation force redirecting structure may, of course, be provided at the rear end of the floor in cooperation with rear side member of a rear end structure within a rear compartment.

Referring again to FIG. 1, the deformation force redirecting structure 7 is formed of one piece extruded part. If desired, it may be formed of a single piece die cast part.

Figure 10:
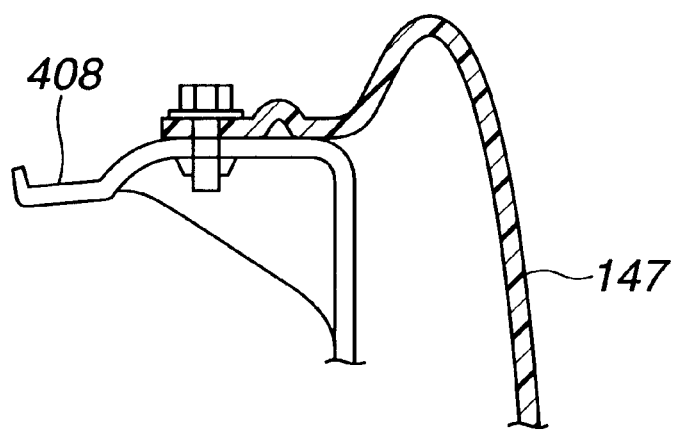
FIG. 10 is a sectional view showing the manner in which a fender panel is connected to a hood side ridge panel.

FIG. 10. shows the provision of a pre-colored synthetic resin fender panel 147 which is connected to one of a hood ridge panel 408 such as shown in FIG. 5. As will be appreciated, the fender panel 147 does not form part of the space-frame chassis structure and is detachably bolted to the hood ridge panel 408. In addition to this, roof panels along with other external panels can be disposed on the space-frame chassis which incorporates embodiments of the deformation force redirecting structure. The use of such panels is facilitated by the material or materials from which the deformation force redirecting structure, side member, floor structure etc., is made and which obviates the need for painting and/or corrosion resistance treatments. In other words, the vehicle can colored using the panels while no coloring/painting of the underlying chassis is necessary.

While the present invention has been particularly described in conjunction with only a limited number of preferred embodiments, the various alternatives, modifications and variations which are possible will be apparent to those skilled in the art in light of the foregoing description. It is therefore contemplated that the appended claims will embrace any such alternatives, modifications and variations as falling within the true scope and spirit of the present invention.

The content of disclosure of Japanese Patent Application No. 11-202050, filed Jul. 15, 1999 on which the content and the priority of this application is based, is hereby incorporated by reference in its entirety.

What is claimed is:

1. A vehicle body structure for a vehicle having a longitudinal center line, comprising:
    a floor structure;
    a side member having an end, said side member extending in a direction essentially parallel to the longitudinal center line;
    a cross panel extending laterally across an end of the floor structure; and
    a deformation force redirecting structure which is connected to said cross panel and which has a force receiving surface portion spaced from an end of said floor, said force receiving surface portion engaging the end of said side member, said deformation force redirecting structure including:
- a first structural portion including said force receiving surface portion,
- a second structural portion interconnecting said first structural portion and a portion of said floor in the proximity of a predetermined end thereof, and
- a third structural portion interconnecting said side member and said floor, said first, second and third structural portions respectively exhibiting deformation resistances which induce the first structural portion to initially deform upon the application of a predetermined amount of pressure on at least a portion of said force receiving surface.

2. A vehicle body structure as claimed in claim 1, wherein at least one of said floor structure, said side member, said cross panel, and said deformation force redirecting structure is made of a corrosion resistant light weight material which obviates the need for an externally applied corrosion preventing coating or treatment.

3. A vehicle body structure as claimed in claim 1, wherein said floor structure, said side member, said cross panel, and said deformation force redirecting structure are each one of extruded and die cast from a corrosion resistant light weight material which obviates the need for an externally applied corrosion preventing coating or treatment.

4. A vehicle body structure as claimed in claim 2, wherein said corrosion resistant light weight material is a light metal alloy.

5. A vehicle body structure as claimed in claim 4, wherein said corrosion resistant light weight material is an aluminum containing alloy.

6. A vehicle body structure as claimed in claim 4, wherein said corrosion resistant light weight material is an aluminum based alloy.

7. A vehicle body structure as claimed in claim 4, wherein said corrosion resistant light weight material is an magnesium containing alloy.

8. A vehicle body structure as claimed in claim 4, wherein said corrosion resistant light weight material is titanium containing alloy.

9. The vehicle body structure as claimed in claim 1, wherein said side member and said floor are extruded parts.

10. The vehicle body structure as claimed in claim 1, wherein said deformation force redirecting structure includes a cross structural member which extends laterally across a longitudinal end of said floor and which is extruded and has at least one extruded feature which extends laterally across the longitudinal end of said floor.

11. The vehicle body structure as claimed in claim 10, wherein said side member is an extruded part which normally extends in a direction generally parallel to the longitudinal center line, and wherein said floor comprises an extruded part and which has at least one extruded feature which extends in a direction generally parallel to the longitudinal center line.

12. The vehicle body structure as claimed in claim 1, wherein said first structural portion has a lower deformation resistance than said third structural portion.

13. The vehicle body structure as claimed in claim 1, wherein said second structural portion has a lower deformation resistance than said third structural portion and a higher deformation resistance than said first structural portion.

14. The vehicle body structure as claimed in claim 12, wherein said first structural portion includes first upper and lower walls which defining a first laterally extending channel which has an essentially uniform cross-sectional profile, and wherein the upper wall has a lower deformation resistance than said lower wall.

15. The vehicle body structure as claimed in claim 1, wherein said first structural portion includes first walls defining a first channel having an essentially uniform cross-sectional profile, said second structural portion includes second walls defining a second channel having an essentially uniform cross-sectional profile, and said third structural portion includes third walls defining a third channel having an essentially uniform cross-sectional profile, and wherein each of the first, second and third channels respectively include at least one reinforcement therein.

16. The vehicle body structure as claimed in claim 15, wherein said deformation force redirecting structure includes a first partition between the first channel and the second channel, a second partition between the first channel and the third channel, and a third partition between the second channel and the third channel,
- wherein said deformation force redirecting structure includes a hub member at which the first, second and third partitions merge,
- wherein said reinforcement wall within said first structural portion extends from the hub member and merges with an upper essentially horizontally extending wall which forms part of the first structural portion and which extends across an upper portion of said first channel, and
- wherein said third partition interconnects said hub member and an upper surface portion of said floor in the proximity of the end of said floor.

17. The vehicle body structure as claimed in claim 16, wherein said deformation force redirecting structure is a one piece extruded part.

18. The vehicle body structure as claimed in claim 16, wherein said deformation force redirecting structure is a one piece die cast part.

19. The vehicle body structure as claimed in claim 16, wherein said reinforcement wall within said third structural portion extends in direction normal to a flat plane which includes the longitudinal center line and a laterally extending vehicle axis and which passes through the hub member.

20. The vehicle body structure as claimed in claim 15, wherein the channels of said second and third structural portions are filled with a filler.

21. The vehicle body structure as claimed in claim 1, wherein said deformation force redirecting structure includes a first socket which receives a portion of said floor, and a second socket which receives a portion of said side member.

22. The vehicle body structure as claimed in claim 1, wherein:
- said first structural portion is discrete from said second and third structural portions,
- said second and third structural portions are unitarily formed with one another,
- said second structural portion has a seat against which a portion of the first structural portion abuts, and
- said first and second structural portions include a hinge mechanism which interconnects the first and second structural portions and which permits limited angular displacement of the first structural portion relative to the second structural portion upon application of a force on said force receiving surface portion which is greater than a predetermined magnitude.

23. The vehicle body structure as claimed in claim 22, wherein said third structural portion comprises a plurality of reinforcing members.

24. The vehicle body structure as claimed in claim 22, wherein at least one of said side member and said floor includes an extruded part.

25. The vehicle body structure as claimed in claim 22, wherein said first and second structural portions are extruded parts, respectively, and said first and second structural portions form a cross structural member of said floor.

26. The vehicle body structure as claimed in claim 22, wherein an end of the second structural portion is formed with first and second spaced seat portions, the second seat portion being disposed more distal from the floor structure than the first seat, wherein the first structural portion has first and second flange portions which respectively seat on the first and second seat portions, wherein the first and second flanges are welded to the respective first and second seat portions with welds which are broken upon the application of a predetermined amount of force to the force receiving portion, and wherein rotation limiting arrangement is provided between the first and second structural portions to limit the amount of relative movement that the first structural portion can undergo about the hinge mechanism with respect to the second structure portions.

27. The vehicle body structure as claimed in claim 22, wherein said third structural portion is connected a structural member of said floor which extends along the longitudinal center line.

28. A vehicle body structure for a vehicle having a longitudinal center line, comprising:

a floor structure, said floor having first and second ends spaced along the longitudinal center line;

a impact redirecting structure disposed with the first end of said floor structure, said impact redirecting structure having at least one force receiving surface portion which is longitudinally spaced in a first direction from the first end of said floor;

said impact redirecting structure including a first structural portion that normally maintains said at least one force receiving surface portion in a predetermined position;

said impact redirecting structure being so constructed and arranged as to provide an arrangement wherein, when said force receiving surface portion is subjected to a force greater than a predetermined magnitude, said force causes said first structural portion to displace said force receiving surface portion away from the predetermined position in which it is normally maintained to a position wherein the magnitude of a moment produced by the force about a point in the proximity of a predetermined end, is reduced.

29. The vehicle body structure as claimed in claim 28, further comprising:

an end structure coupled to said impact redirecting structure and which is arranged to apply force to said impact redirecting structure through said force receiving surface portion.

30. A vehicle body structure for a vehicle having a longitudinal center line, comprising:

a floor structure which extends along the longitudinal center line;

a side member which normally extends in a direction generally parallel relationship with the longitudinal center line; and a impact redirecting structure which interconnects said floor structure and said side member so that a predetermined amount of offset is normally maintained therebetween, said impact redirecting structure including means for, in response to an impact force greater than a predetermined magnitude being applied along said side member in response to a vehicle collision, undergoing controlled deformation and pivoting said side member with respect to said floor structure to orient said side member in a direction wherein the side member is directed toward the floor and assumes a position which reduces the magnitude of a moment of force produced by the impact force about a portion of said impact redirecting structure which is located between said side member and said floor structure.

31. A method of absorbing impact energy upon an end-on collision of a vehicle having a passenger compartment and another compartment immediately adjacent the passenger compartment, comprising:

subjecting a side member to vehicle collision generated force;

guiding re-orientation of said side member, using a structure having a plurality of different structural strengths and which interconnects the side member and a floor structure of the passenger compartment, from a normal pre-collision orientation to one wherein the side member is, in response to the collision generated force, directed toward a point in proximity of a longitudinal end of the floor structure so as to reduce a moment of force which is produced about the point by the collision generated force acting along the side member, and transmitting the collision generated force from said side member directly toward the floor.

32. A vehicle body structure for a vehicle having a longitudinal center line, comprising:

a floor structure which extends along the longitudinal center line;

a side member which normally extends in a direction generally parallel relationship with the longitudinal center line;

a side panel which is supported adjacent said side member;

an external pre-colored, synthetic resin panel which is detachably connected to the side fender; and an impact redirecting structure which interconnects said floor structure and said side member so that a predetermined amount of offset is normally maintained therebetween, said impact redirecting structure including means for, in response to an impact force greater than a predetermined magnitude being applied along said side member in response to a vehicle collision, undergoing controlled deformation and pivoting said side member with respect to said floor structure to orient said side member in a direction wherein the side member is directed toward the floor and assumes a position which reduces the magnitude of a moment of force produced by the impact force about a portion of said impact redirecting structure which is located between said side member and said floor structure.

33. A vehicle body structure comprising:

an extruded elongate hollow multi-channel force receiving and redirecting structure, said force receiving and redirecting structure having an upper connection site adapted for connection to at least one side member, and a lower connection site adapted to be disposed across and connected to a laterally extending end portion of a floor structure of a passenger cabin, said force receiving and redirecting structure comprising:

elongate walls which define elongate channels therebetween, first and second pluralities of the elongate walls respectively merging at first and second elongate hub structures which extend through an interior of force receiving and redirecting structure, said elongate walls having predetermined physical properties selected to provide a plurality of different rigidity zones within the force receiving and redirecting structure which zones sequentially deform when a force, which is in excess of a predetermined magnitude, is applied to the upper connection site, causes deformation of walls immediately adjacent the upper connection site, induces the upper connection site to pivot about the first hub structure and become oriented toward the lower connection site so that force received at the upper connection site is directed toward the second hub structure and the lower direction site.

34. A vehicle body structure as claimed in claim 33, at least one of said side member, said cross panel, and said deformation force redirecting structure is made of a corrosion resistant light weight material which obviates the need for an externally applied corrosion preventing coating or treatment.

* * * * *